(12) United States Patent
Appireddygari Venkataramana et al.

(10) Patent No.: US 11,379,317 B2
(45) Date of Patent: Jul. 5, 2022

(54) UNINTERRUPTED FILE LEVEL RESTORE SERVICE USING SIAMESE ENGINE

(71) Applicant: EMC IP Holding Company LLC, Hopkinton, MA (US)

(72) Inventors: Mahesh Reddy Appireddygari Venkataramana, Bangalore (IN); Chetan Battal, Banglore (IN); Mahantesh Ambaljeri, Banglore (IN); Swaroop Shankar DH, Bangalore (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 371 days.

(21) Appl. No.: 16/734,243

(22) Filed: Jan. 3, 2020

(65) Prior Publication Data
US 2021/0208979 A1    Jul. 8, 2021

(51) Int. Cl.
*G06F 11/14* (2006.01)
*G06F 16/174* (2019.01)
*G06F 21/60* (2013.01)

(52) U.S. Cl.
CPC ...... *G06F 11/1469* (2013.01); *G06F 16/1744* (2019.01); *G06F 21/602* (2013.01)

(58) Field of Classification Search
CPC ............. G06F 11/1469; G06F 16/1744; G06F 21/602; G06F 16/122; G06F 21/10; G06F 2221/0782
See application file for complete search history.

(56) References Cited

U.S. PATENT DOCUMENTS 10,503,427 B2 * 12/2019 Botes .................. G06F 11/2048

\* cited by examiner

*Primary Examiner* — David Yi
*Assistant Examiner* — Dustin B. Fulford
(74) *Attorney, Agent, or Firm* — Womble Bond Dickinson (US) LLP

(57) ABSTRACT

Methods and systems for restoring data to a host device are described. According to some embodiments, a hybrid buffer may be used to generate a twin file of each file object to be restored and append the twin file to the corresponding file object. Each file object and its corresponding twin file may be transmitted to a construction container via a restore agent. In the event of an unexpected abort during the first restoration session, the restore agent may preserve the twin file of a file object currently being restored (if one has been created at the time of the abort) and instruct the hybrid buffer to terminate operation. During a subsequent restore session, the restore agent may poll for the preserved twin file and commence the data restore operation from the file object currently being restored using the twin file.

20 Claims, 6 Drawing Sheets

US 11,379,317 B2

UNINTERRUPTED FILE LEVEL RESTORE SERVICE USING SIAMESE ENGINE

FIELD OF THE INVENTION

Embodiments of the present invention relate generally to data storage systems. More particularly, embodiments of the invention relate uninterrupted file level data restoration.

BACKGROUND

Unexpected events can cause backup and/or restore operations to abort prior to the completion of such operations. The need to start successive restores from the point of interruption to avoid an increase in the restore window has become vital nowadays. While a restore operation is in progress, a random unintended event may cause the restore operation to abruptly abort, in turn causing data to be partially written (e.g., half written) back to the host device. Also, the restore operation would be rolled back after an abort in most cases resulting in the data already written being unusable and also resulting in a potentially corrupted production environment owing to the partial restore. Such situation may lead to an increase of the restore window. Additionally, the restore operation must be restarted again from the beginning, even though there are some portions of backup or restore data that have been completed.

The restore logic on a host device would need to include logic that provides a service-level agreement (SLA) for achieving any successive backup or restore from an improper or random or unintended abort to be continuous in nature. The aim of restore logic during such scenarios would be to have the successive backup or restore to be started from the point of abort, without the necessity of having to restart from the beginning, and to avoid any further increase in the restore window.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
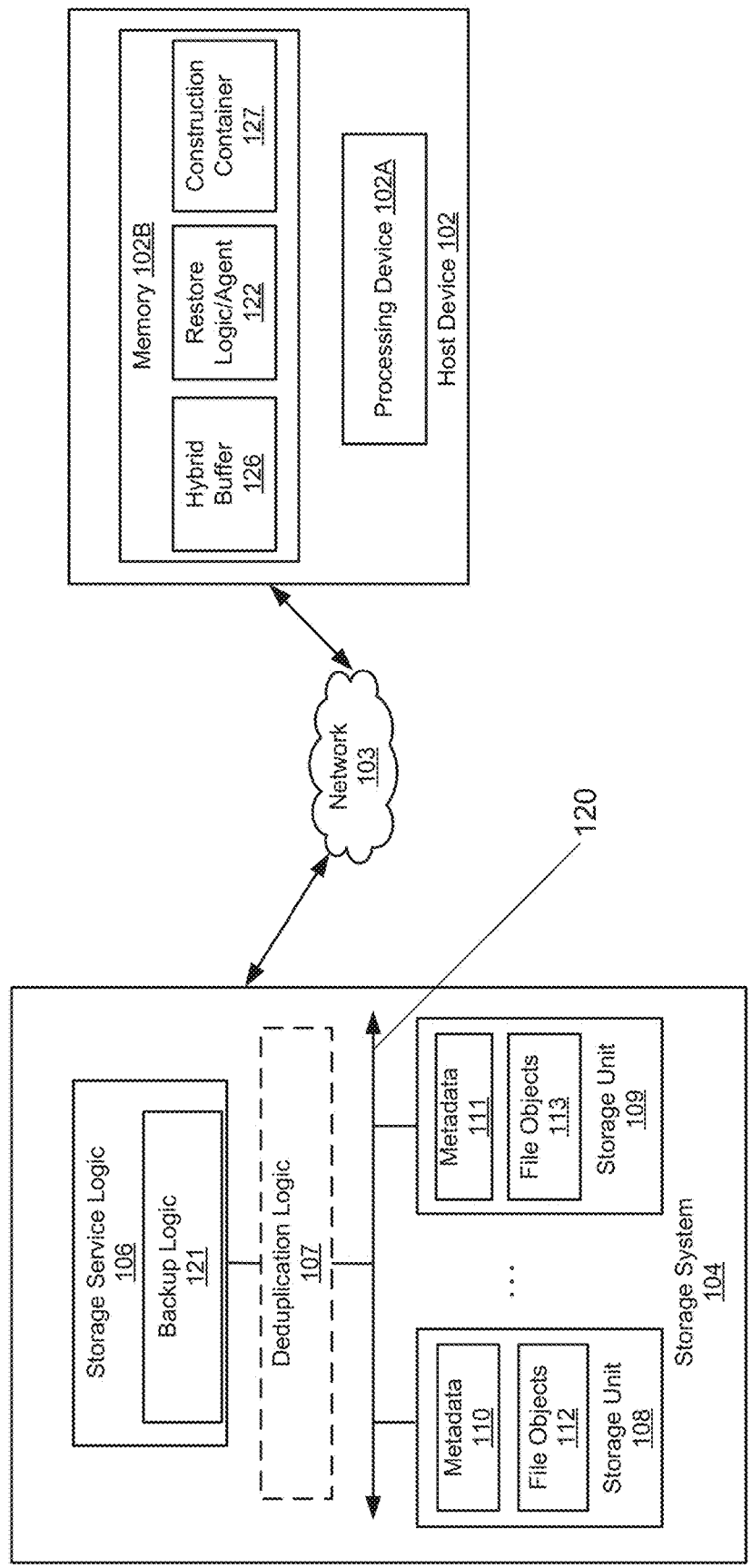
FIG. 1 is a block diagram illustrating a storage system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention disclose how an abrupt abort may be identified during a restore operation, and ensure a safe uninterrupted restore from the aborted point in the next restore session. In one embodiment, a host device may receive a set of file objects to be restored. The host device may include a hybrid buffer used to generate a twin file of each file object to be restored (e.g., file objects that data requested to be restored is comprised of) and append the twin file to the corresponding file object. Each file object and its corresponding twin file may be transmitted to a construction container via a restore agent. The host device may reconstruct the data to be recovered using the construction container once all of the requested file objects have been restored. In the event of an unexpected abort during the first restoration session, the host device may preserve the twin file of a file object currently being restored (if one has been created at the time of the abort) using the restore agent and instruct the hybrid buffer to terminate operation. During a subsequent restore session, the restore agent may poll for the twin file of the file object currently being restored and commence the data restore operation from the file object currently being restored using the twin file.

According to some embodiments, a method for restoring data to a host device is described. The method receives a first set file object to be restored, and a hybrid buffer may be used to generate a twin file of each file object to be restored (e.g., file objects that data requested to be restored is comprised of) and append the twin file to the corresponding file object. Each file object and its corresponding twin file may be transmitted to a construction container via a restore agent. The construction container may reconstruct the data to be recovered once all of the requested file objects have been restored. In the event of an unexpected abort during the first restoration session, the restore agent may preserve the twin file of a file object currently being restored (if one has been created at the time of the abort) and instruct the hybrid buffer to terminate operation. During a subsequent restore session, the restore agent may poll for the twin file of the file object currently being restored and commence the data restore operation from the file object currently being restored using the twin file.

According to some embodiments, a non-transitory computer readable medium storing instructions for restoring data to a host device is described. When executed by a processing device, the instructions cause the processing device to receive a first set file object to be restored, and generate, using a hybrid buffer, a twin file of each file object to be restored (e.g., file objects that data requested to be restored is comprised of) and append the twin file to the corresponding file object. Each file object and its corresponding twin file may be transmitted to a construction container via a restore agent. The processing device may reconstruct the data to be recovered using a construction container once all of the requested file objects have been restored. In the event of an unexpected abort during the first restoration session, the processing device may preserve the twin file of a file object currently being restored (if one has been created at the time of the abort) using the restore agent and instruct the hybrid buffer to terminate operation. During a subsequent restore session, the restore agent may poll for the twin file of the file object currently being restored and commence the data restore operation from the file object currently being restored using the twin file.

FIG. 1 is a block diagram illustrating a storage system 100 according to some embodiments of the invention. Referring to FIG. 1, system 100 includes, but is not limited to, host device 102 communicatively coupled to storage system 104 over network 103. Host device 102 may be any type of client device such as a server, a personal computer (e.g., desktops, laptops, and tablets), a "thin" client, a personal digital assistant (PDA), a Web enabled appliance, or a mobile phone (e.g., Smartphone), etc. Alternatively, the host device 102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, whether wired or wireless. Host device 102 and storage system 104 may be in physical proximity or may be physically remote from one another.

Storage system 104 (also referred to herein as target device 104) may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service logic 106 (also referred to as service logic, service module, or service unit, which may be implemented in software, hardware, or a combination thereof), optional deduplication logic 107, and one or more storage units or devices 108-109 communicatively coupled to each other (e.g., via interconnect 120). Storage service engine 106 may represent any storage service related components configured or adapted to provide storage services (e.g., storage as a service) to a variety of clients using any of the access protocols set forth above. Storage service logic 106 may include backup logic 121, which is configured to receive and back up data from a client (e.g., host device 102) and to store the backup data in any one or more of storage units 108-109.

Host device 102 may include hybrid buffer 126, construction container 127, and restore agent 122, each of which may be implemented in software, hardware, or a combination thereof. For example, each of the hybrid buffer 126, construction container 127, and restore agent 122 may be implemented as software modules stored in memory 102B, firmware in processing device 102A, or may be separate from the processing device 102A (e.g., may be a separate circuit, field programmable gate array (FPGA), application specific integrated circuit (ASIC), a process running on another processing device, etc.). Each of the hybrid buffer 126, construction container 127, and restore agent 122 may comprise software or logic to perform the corresponding functions described herein.

Restore agent 122 may include logic to retrieve and restore backup data from any one or more of storage devices 108-109 back to the host device 102. In one embodiment, to restore the backup data, restore agent 122 may transmit a request for data that may indicate file objects to be restored to the storage system 104, which may read the file objects identified in the request from a storage device (e.g., storage devices 108-109), and transmit the file objects back to the host device 102. The hybrid buffer 124 may function to create twin files of each file object received from the storage system 104 in this way, as discussed in further detail herein. A twin file of a file object may include details that allow the host device 102 to identify and interpret the file object as discussed in further detail herein. The hybrid buffer 126 may transmit the file objects and corresponding twin files to the restore agent 122, which may transmit the file objects and twin files to the construction container 127 (e.g., conditional construction container) which may reconstruct the requested data from the received backup file objects as discussed in further detail herein.

Storage devices 108-109 may be implemented locally (e.g., single node operating environment) or remotely (e.g., multi-node operating environment) via interconnect 120, which may be a bus and/or a network (e.g., a storage network or a network similar to network 103). Storage devices 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage devices 108-109 may be located locally or may be remotely accessible over a network.

In response to a data file to be stored in storage devices 108-109, according to one embodiment, deduplication logic 107 is configured to segment the data file into multiple segments (also referred to as chunks), for example as file objects 112-113, according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage devices 108-109 or across at least some of storage devices 108-109. The metadata, such as metadata 110-111, may be stored in at least some of storage devices 108-109, such that files can be accessed independent of another storage unit. Metadata of each storage unit includes enough information to provide access to the files it contains.

Figure 2A:
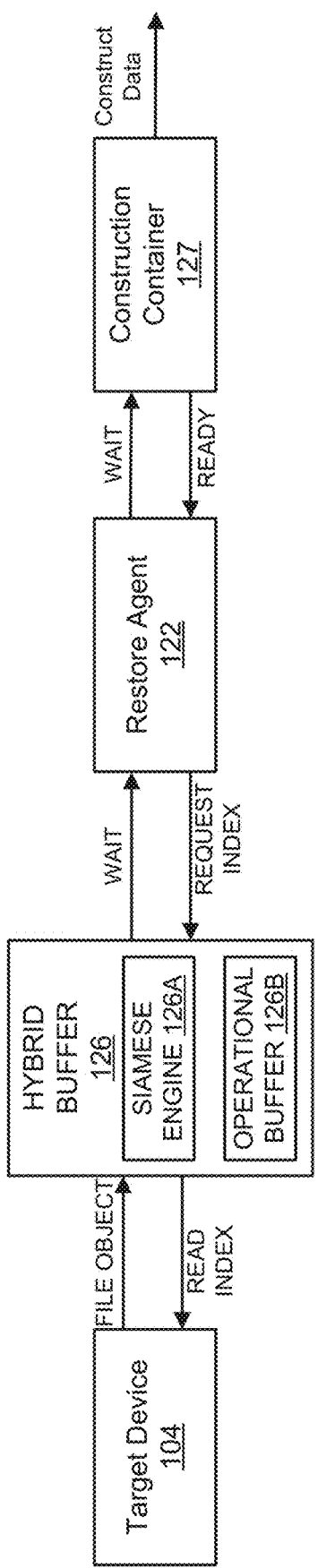
FIGS. 2A-2D are block diagrams illustrating a restore operation according to one embodiment.

FIGS. 2A-2D are block diagrams illustrating a restore operation according to one embodiment of the present disclosure. Referring to FIG. 2A, restore agent 122 receives a request to restore data that is backed up in storage system 104 (e.g., the target device). The request may comprise one or more request indexes, which are entities that are queried (e.g., by the restore agent 122) during the restore request, and may include information such as a backup id, save set object information, target media reservation, backup object id, and the start and end time of the backup. These details are required and persisted for restore agent 122 to hit the right save object/item to be restored from the storage system 104.

Restore agent 122 may transmit the request index(es) to the hybrid buffer 126, which comprises the Siamese engine 126A and the operational buffer 126B. The Siamese engine 126A may function to create twin files of any file objects it receives, as discussed in further detail herein. The operational buffer 126B may function to facilitate communication between the restore agent 122 and the storage system 104, as discussed in further detail herein. More specifically, the operational buffer 126B may store the request index, and generate a read index from the request index and transmit the read index to the storage system 104, thus triggering a first restore session. The storage system 104, upon receiving the read index, may search for the file objects requested using the read index and transmit them to the hybrid buffer 126 for recovery on the host device 102. Storage system 104 may transmit the indexed file objects to the hybrid buffer 126 in burst or sequence fashion. The example of FIGS. 2A-2D may assume that the storage system 104 transmits the indexed file objects to the hybrid buffer sequentially.

Figure 2B:
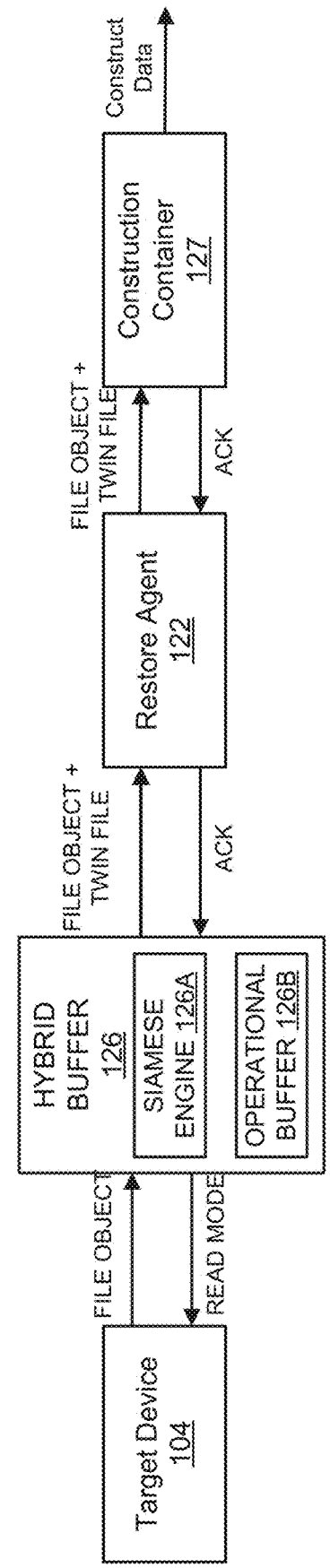

Referring to FIG. 2B, upon receiving a file object from the storage system 104, the Siamese engine 126A may create a twin file of the file object (i.e. the file object currently being restored) that includes details that may be used (e.g., by restore agent 122) to identify and interpret the file object. More specifically, the Siamese engine 126A may encrypt and compress the payload of the file object, resulting in a smaller file size. The Siamese engine 126A may append a header and tailer to the compressed and encrypted payload of the file object that may point to the file object. In some embodiments, the Siamese engine 126A may omit security measures (e.g., cyclic redundancy check) when encrypting and compressing the data so as to achieve the smallest possible file size for the twin file. The Siamese engine 126A may use any appropriate algorithm to perform the encrypting and compressing. In some embodiments, the Siamese engine 126A may perform a hash on the payload of the file object to generate the twin file for the file object. Upon generating the twin file, the Siamese engine 126A may append the twin file to the file object and transmit the file object (with the appended twin file) to the restore agent 122 as well as store the file object and appended twin file in the operational buffer 126B. In some embodiments, the twin file and the file object may replace the request index in the operational buffer 126B. Upon receiving the twin file and the file object, the restore agent 122 may send an acknowledgement to the hybrid buffer 126 and route the file object with the twin file to the construction container 127 (e.g., conditional construction container (CCC)), which may send an acknowledgement to the restore agent 122 upon receiving the file object and twin file. The process of receiving a file object at the hybrid buffer 126, generating a twin file for the file object, appending the twin file to the file object, storing the twin file and the file object in the operational buffer 126B, and transmitting the file object and corresponding twin file to the construction container 127 may be referred to as restoring that file object. The construction container 127 may wait until the last file object corresponding to the requested data has been successfully restored before reconstructing the data from the restored file objects. Thus, during the first restore session, the file objects requested may be sequentially restored until all requested file objects have been restored and can be reconstructed.

Figure 2C:
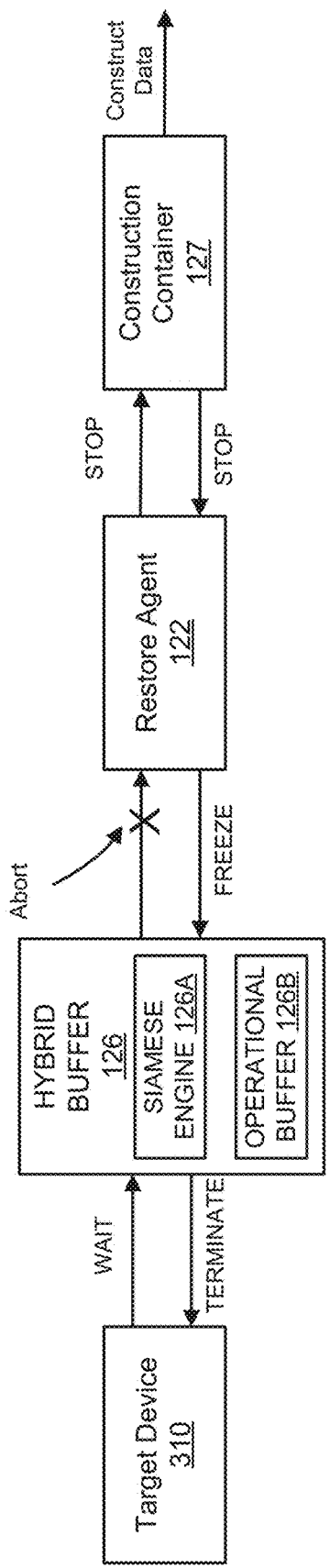

Referring to FIG. 2C, if an unexpected abort occurs during the first restore session, the restore agent 122 may immediately preserve the twin file of a file object that is currently being restored (if one has been created when the abort occurs). The restore agent 122 may detect the abort and instruct the hybrid buffer 126 to enter wait mode, and terminate its current operation. In some embodiments, if an unexpected abort occurs when the storage system 104 is retrieving a file object for transmission to the hybrid buffer 126 (e.g., before the hybrid buffer 126 receives the file object), the storage system 104 may inform the restore agent 122 that there has been an abort, and the restore agent 122 may instruct the hybrid buffer 126 to enter wait mode, and terminate its current operation. In some embodiments, if an unexpected abort occurs when the storage system 104 is retrieving a file object for transmission to the hybrid buffer 126 (e.g., before the hybrid buffer 126 receives the file object), the storage system 104 may inform the restore agent 122 that there has been an abort and instruct the hybrid buffer 126 to enter wait mode and terminate its current operation itself.

In the case of an unexpected abort, safeguarding the twin file is a primary concern. However, an unintended abort may leave only an insignificant time window and a minimal number of remaining CPU cycles of processing device 102A before termination of the first restore session. Thus, the restore agent 122 may utilize any remaining CPU cycles to push the twin file to a safe stage of the restore operation where it may be stored. For example, if the twin file is on the way to or currently located at the construction container 127 when the unexpected abort is detected, the restore agent 122 may use the remaining CPU cycle(s) to perform a push operation to ensure the twin file reaches the construction container 127 and instruct the container 127 to save the twin file. In another example, if the twin file is at the restore agent 122 when the unexpected abort occurs, this may be an indication that the twin file is currently within a cache memory (not shown) of the host device 102, and thus restore agent 122 may utilize the remaining CPU cycles to preserve the twin file in the cache memory of host device 102. However, if the twin file is between the hybrid buffer 126 and the restore agent 122 (e.g., en route to the restore agent 122) when the abort is detected, then the restore agent 122 may prioritize the hybrid buffer 126 as a storage location for the twin file and utilize any remaining CPU cycles to push the twin file back to the operational buffer 126B. In this way, no additional cache memory of the host device 102 must be utilized to preserve the twin file unless the twin file is residing at the restore agent 122 at the time of the abort. In yet another example, if the twin file has just been created, but has not yet left the hybrid buffer 126 when the abort is detected, the restore agent 122 may instruct the hybrid buffer 126 to hold the twin file at the operational buffer 126B. In some embodiments, if the unexpected abort occurs before the twin file is appended to the file object or transmitted to the restore agent 122, and the twin file cannot be stored at the operational buffer 126B due to some restriction (e.g., an insufficient memory condition), then the restore agent 122 may instruct the hybrid buffer 126 to transmit the twin file to the storage system 104 for storage.

Figure 2D:
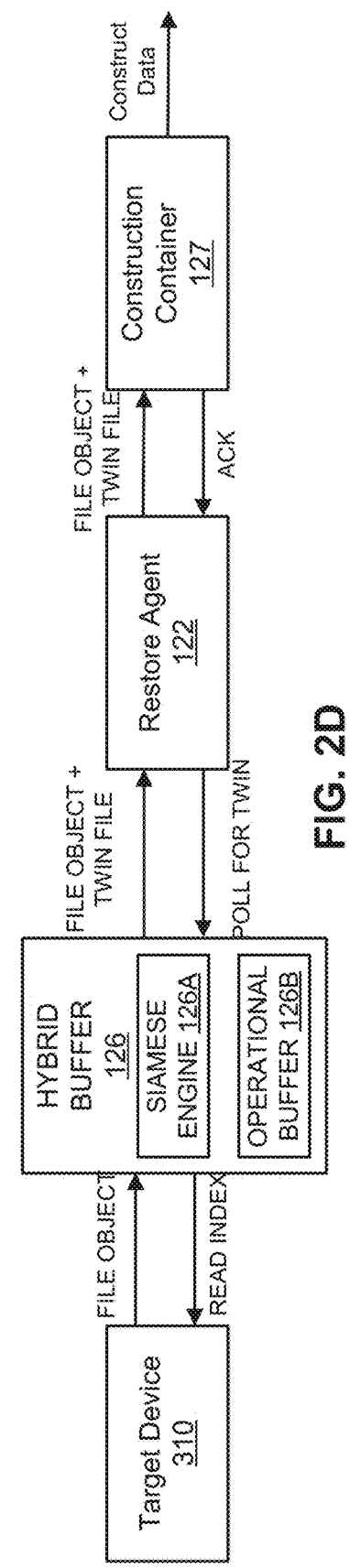

Referring to FIG. 2D, a subsequent restore session may be initiated and construction container 127 may transmit an acknowledgement to the restore agent 122 indicating that an abort occurred previously. When the restore agent 122 receives this acknowledgement during the first CPU cycle of the subsequent restore session, it may begin polling the construction container 127 and the hybrid buffer 126 for a twin file (e.g., the twin file of the file object currently being restored). If a twin file is stored in the operational buffer 126B, the hybrid buffer 126 will acknowledge the restore agent 122 and transmit the twin file to the restore agent 122 in a format that is understandable and readable by the restore agent 122. If a twin file is stored in the construction container 127, the construction container 127 will acknowledge the restore agent 122 and transmit the twin file to the restore agent 122 in a format that is understandable and readable by the restore agent 122. In some embodiments, if the twin file is stored in the storage system 104, then the operational buffer 126B will poll the storage system 104 and route the acknowledgement and twin file from the storage system 104 to the restore agent 122. The restore agent 122 may refrain from polling the storage system 104 directly owing to the conventional restore communications between the storage system 104 and the restore agent 122, which may lead the storage system 104 to believe that the twin file is another file to be backed up and result in an error in operation (e.g., while attempting to decrypt it).

Upon obtaining the twin file, the restore agent 122 may decode the twin file, determine the status of the file object currently being restored, and then restore the file object currently being restored. More specifically, because the file object currently being restored is already located in the operational buffer 126B, the restore agent 122 may instruct the operational buffer 126B to transmit the file object currently being restored to the construction container 127 via the restore agent 122.

In some embodiments, if the unexpected abort occurs before any file object has been received by the hybrid buffer 126 (e.g., no twin files have thus been created), the restore agent 122, upon receiving no acknowledgements from the hybrid buffer 126 or the construction container 127, may determine that no file object has been received by the hybrid buffer 126. Thus, remote agent 122 may instruct the operational buffer 126B to transmit the read index for the data requested to be restored to the target device 104 (i.e., storage system 104) once again to begin the restore process anew. Because the request index would have been stored in the operational buffer 126B in the previous cycle (e.g., as per normal restore procedures), and has not been overwritten by a twin file and file object, operational buffer 126B may simply generate the read index once again and transmit it to the target device 104.

Figure 3:
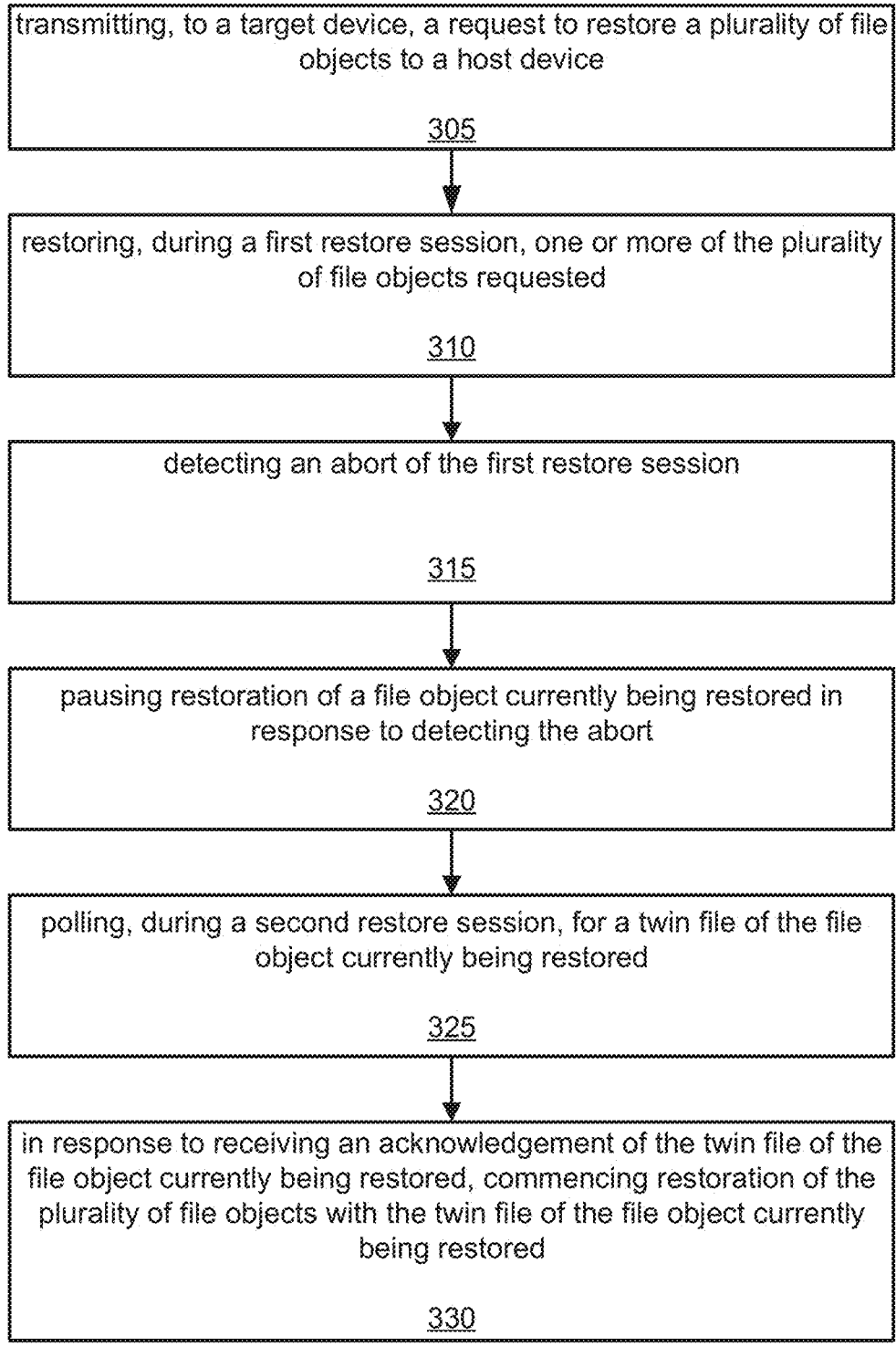
FIG. 3 is a flow diagram illustrating a method for backing up data to a target device according to one embodiment.

FIG. 3 is a flow diagram illustrating a method 300 for uninterrupted restoration of data to a host device, in accordance with some embodiments of the present disclosure. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by host device 102 (e.g., as illustrated in FIG. 1).

Referring to FIG. 3, at block 305, the host device 102 may transmit, to storage system 104, a request to restore a plurality of file objects to a host device. The request may comprise one or more request indexes, which are entities that are queried (e.g., by the restore agent 122) during the restore request, and may include information such as a backup id, save set object information, target media reservation, backup object id, and the start and end time of the backup. These details are required and persisted for restore agent 122 to hit the right save object/item to be restored from the storage system 104.

Restore agent 122 may transmit the request index(es) to the hybrid buffer 126, which comprises the Siamese engine 126A and the operational buffer 126B. The Siamese engine 126A may function to create twin files of any file objects it receives, as discussed in further detail herein. The operational buffer 126B may function to facilitate communication between the restore agent 122 and the storage system 104, as discussed in further detail herein. More specifically, the operational buffer 126B may store the request index, and generate a read index from the request index and transmit the read index to the storage system 104, thus triggering a first restore session. The storage system 104, upon receiving the read index, may search for the file objects requested using the read index and transmit them to the hybrid buffer 126 for recovery on the host device 102. Storage system 104 may transmit the indexed file objects to the hybrid buffer 126 in burst or sequence fashion.

At block 310, host device 102 may restore, during a first restore session, one or more of the plurality of file objects requested. Referring also to FIG. 2B, upon receiving a file object from the storage system 104, the Siamese engine 126A may create a twin file of the file object (i.e. the file object currently being restored) that includes details that may be used (e.g., by restore agent 122) to identify and interpret the file object. More specifically, the Siamese engine 126A may encrypt and compress the payload of the file object, resulting in a smaller file size. The Siamese engine 126A may append a header and tailer to the compressed and encrypted payload of the file object that may point to the file object. In some embodiments, the Siamese engine 126A may omit security measures (e.g., cyclic redundancy check) when encrypting and compressing the data so as to achieve the smallest possible file size for the twin file. The Siamese engine 126A may use any appropriate algorithm to perform the encrypting and compressing. In some embodiments, the Siamese engine 126A may perform a hash on the payload of the file object to generate the twin file for the file object. Upon generating the twin file, the Siamese engine 126A may append the twin file to the file object and transmit the file object (with the appended twin file) to the restore agent 122 as well as store the file object and appended twin file in the operational buffer 126B. In some embodiments, the twin file and the file object may replace the request index in the operational buffer 126B. Upon receiving the twin file and the file object, the restore agent 122 may send an acknowledgement to the hybrid buffer 126 and route the file object with the twin file to the construction container 127 (e.g., conditional construction container (CCC)), which may send an acknowledgement to the restore agent 122 upon receiving the file object and twin file.

Figure 4:
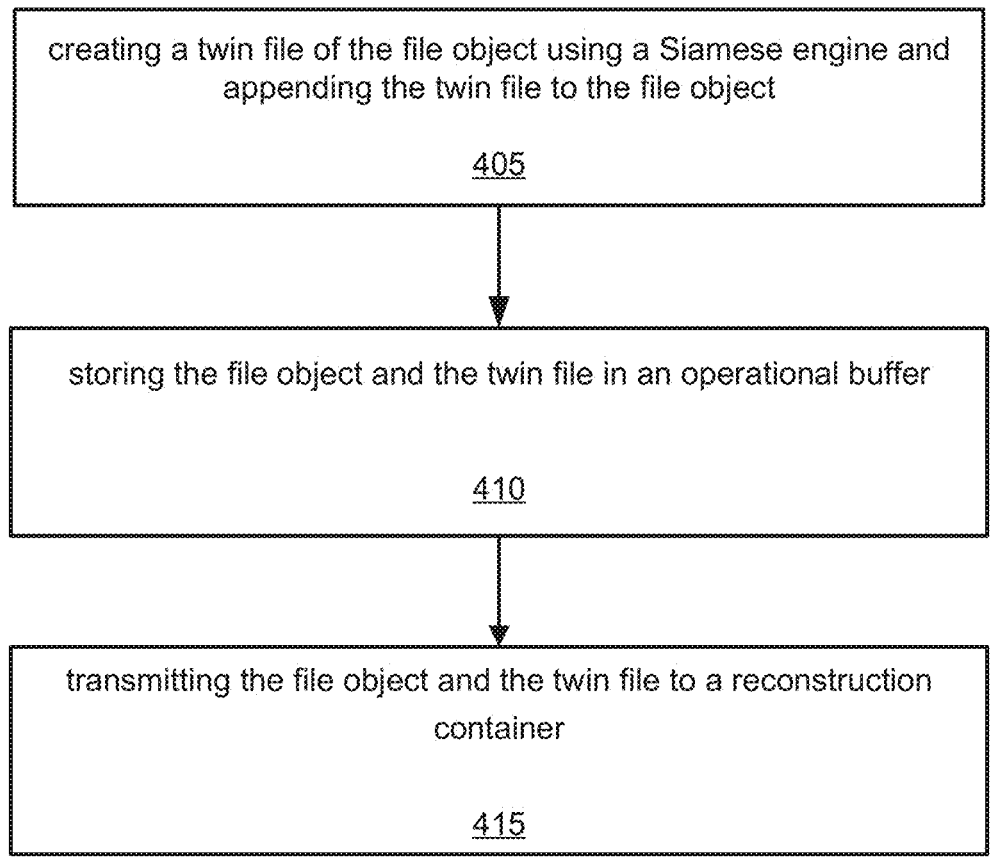
FIG. 4 is a flow diagram illustrating a method for restoring data from a target device according to one embodiment.

FIG. 4 is a flow diagram illustrating a method 400 for restoring a file object, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by host device 102 (e.g., as illustrated in FIG. 1).

The hybrid buffer 126 may receive a file object, and at block 405, generate a twin file for the file object, at block 410, append the twin file to the file object, and at block 415, store the twin file and the file object in the operational buffer 126B, and transmitting the file object and corresponding twin file to the construction container 127. The construction container 127 may wait until the last file object corresponding to the requested data has been successfully restored before reconstructing the data from the restored file objects.

Thus, during the first restore session, the file objects requested may be sequentially restored until all requested file objects have been restored and can be reconstructed.

Referring back to FIG. 3, at block 315, host device 102 may detect an abort during the first restore session. Referring also to FIG. 2C, if an unexpected abort occurs during the first restore session, the restore agent 122 may immediately preserve the twin file of a file object that is currently being restored (if one has been created when the abort occurs). The restore agent 122 may detect the abort and at block 320, instruct the hybrid buffer 126 to enter wait mode, and terminate its current operation, thereby pausing the restoration of a file object currently being restored. In some embodiments, if an unexpected abort occurs when the storage system 104 is retrieving a file object for transmission to the hybrid buffer 126 (e.g., before the hybrid buffer 126 receives the file object), the storage system 104 may inform the restore agent 122 that there has been an abort, and the restore agent 122 may instruct the hybrid buffer 126 to enter wait mode, and terminate its current operation. In some embodiments, if an unexpected abort occurs when the storage system 104 is retrieving a file object for transmission to the hybrid buffer 126 (e.g., before the hybrid buffer 126 receives the file object), the storage system 104 may inform the restore agent 122 that there has been an abort and instruct the hybrid buffer 126 to enter wait mode and terminate its current operation itself.

In the case of an unexpected abort, safeguarding the twin file is a primary concern. However, an unintended abort may leave only an insignificant time window and a minimal number of remaining CPU cycles of processing device 102A before termination of the first restore session. Thus, the restore agent 122 may utilize any remaining CPU cycles to push the twin file to a safe stage of the restore operation where it may be stored. For example, if the twin file is on the way to or currently located at the construction container 127 when the unexpected abort is detected, the restore agent 122 may use the remaining CPU cycle(s) to perform a push operation to ensure the twin file reaches the construction container 127 and instruct the container 127 to save the twin file. In another example, if the twin file is at the restore agent 122 when the unexpected abort occurs, this may be an indication that the twin file is currently within a cache memory (not shown) of the host device 102, and thus restore agent 122 may utilize the remaining CPU cycles to preserve the twin file in the cache memory of host device 102. However, if the twin file is between the hybrid buffer 126 and the restore agent 122 (e.g., en route to the restore agent 122) when the abort is detected, then the restore agent 122 may prioritize the hybrid buffer 126 as a storage location for the twin file and utilize any remaining CPU cycles to push the twin file back to the operational buffer 126B. In this way, no additional cache memory of the host device 102 must be utilized to preserve the twin file unless the twin file is residing at the restore agent 122 at the time of the abort. In yet another example, if the twin file has just been created, but has not yet left the hybrid buffer 126 when the abort is detected, the restore agent 122 may instruct the hybrid buffer 126 to hold the twin file at the operational buffer 126B. In some embodiments, if the unexpected abort occurs before the twin file is appended to the file object or transmitted to the restore agent 122, and the twin file cannot be stored at the operational buffer 126B due to some restriction (e.g., an insufficient memory condition), then the restore agent 122 may instruct the hybrid buffer 126 to transmit the twin file to the storage system 104 for storage.

Referring also to FIG. 2D, a subsequent restore session may be initiated and construction container 127 may transmit an acknowledgement to the restore agent 122 indicating that an abort occurred previously. At block 325, when the restore agent 122 receives this acknowledgement during the first CPU cycle of the subsequent restore session, it may begin polling the construction container 127 and the hybrid buffer 126 for a twin file (e.g., the twin file of the file object currently being restored). If a twin file is stored in the operational buffer 126B, the hybrid buffer 126 will acknowledge the restore agent 122 and transmit the twin file to the restore agent 122 in a format that is understandable and readable by the restore agent 122. If a twin file is stored in the construction container 127, the construction container 127 will acknowledge the restore agent 122 and transmit the twin file to the restore agent 122 in a format that is understandable and readable by the restore agent 122. In some embodiments, if the twin file is stored in the storage system 104, then the operational buffer 126B will poll the storage system 104 and route the acknowledgement and twin file from the storage system 104 to the restore agent 122. The restore agent 122 may refrain from polling the storage system 104 directly owing to the conventional restore communications between the storage system 104 and the restore agent 122, which may lead the storage system 104 to believe that the twin file is another file to be backed up and result in an error in operation (e.g., while attempting to decrypt it).

At block 330, host device 102 may commence restoration of the plurality of file objects with the twin file of the file object currently being restored. More specifically, upon obtaining the twin file, the restore agent 122 may decode the twin file, determine the status of the file object currently being restored, and then restore the file object currently being restored. Because the file object currently being restored is already located in the operational buffer 126B, the restore agent 122 may instruct the operational buffer 126B to transmit the file object currently being restored to the construction container 127 via the restore agent 122.

In some embodiments, if the unexpected abort occurs before any file object has been received by the hybrid buffer 126 (e.g., no twin files have thus been created), the restore agent 122, upon receiving no acknowledgements from the hybrid buffer 126 or the construction container 127, may determine that no file object has been received by the hybrid buffer 126. Thus, remote agent 122 may instruct the operational buffer 126B to transmit the read index for the data requested to be restored to the target device 104 once again to begin the restore process anew. Because the request index would have been stored in the operational buffer 126B in the previous cycle (e.g., as per normal restore procedures), and has not been overwritten by a twin file and file object, operational buffer 126B may simply generate the read index once again and transmit it to the target device 104.

Figure 5:
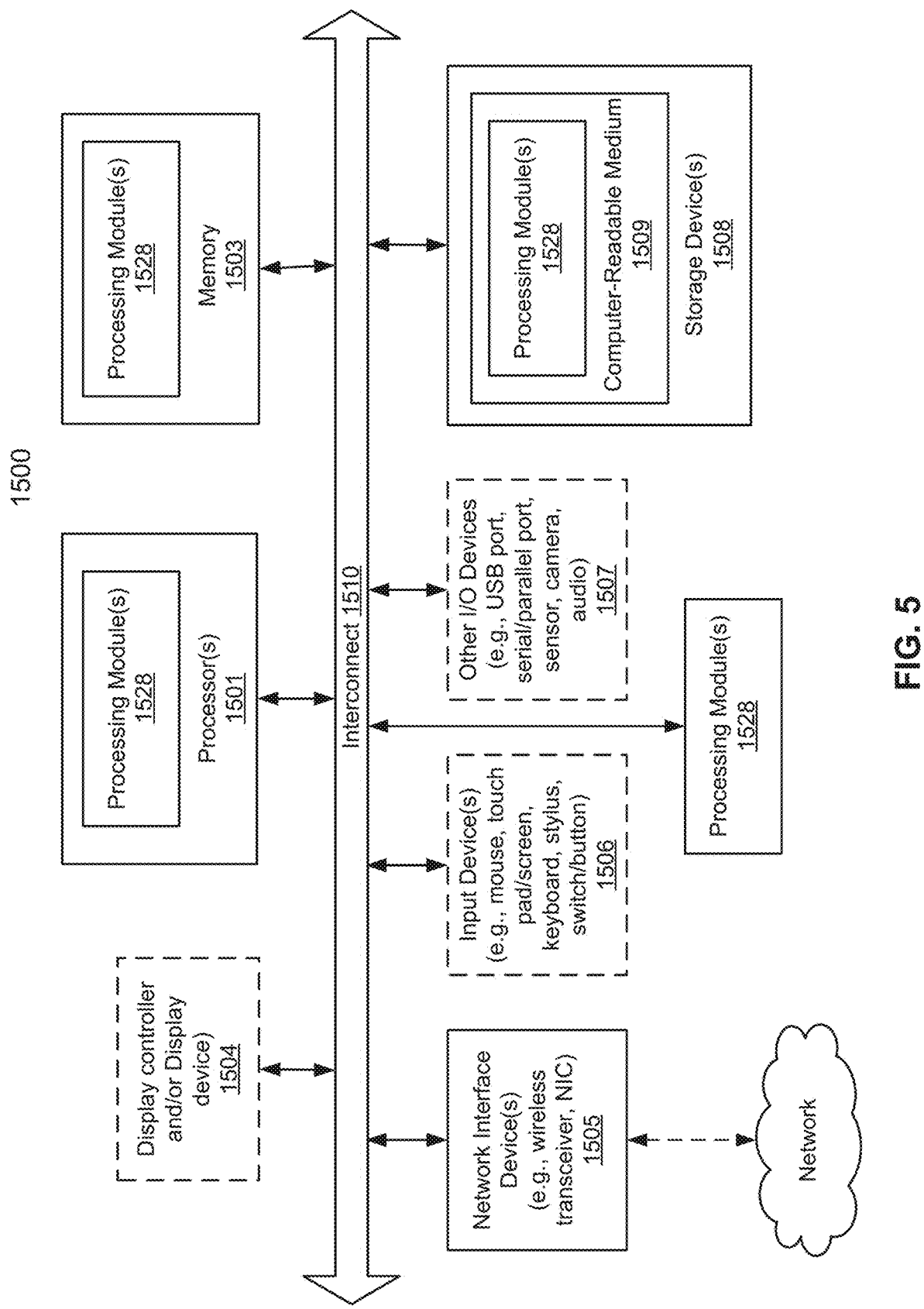
FIG. 5 is a block diagram illustrating a data processing system according to one embodiment.

FIG. 5 is a block diagram illustrating an example of a data processing system which may be used with one embodiment. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, modules 121-127 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/ logic 1528 may further be transmitted or received over a network via network interface device 1505.

Computer-readable storage medium 1509 may also be used to store the software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/ logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
transmitting, to a target device, a request to restore a plurality of file objects to a host device;
restoring, during a first restore session, one or more of the plurality of file objects requested, wherein restoring a file object comprises:
creating a twin file of the file object using a Siamese engine and appending the twin file to the file object;
storing the file object and the twin file in an operational buffer; and
transmitting the file object and the twin file to a reconstruction container;
detecting an abort of the first restore session;
pausing restoration of a file object currently being restored in response to detecting the abort;
polling, during a second restore session, for a twin file of the file object currently being restored; and
in response to receiving an acknowledgement of the twin file of the file object currently being restored, commencing restoration of the plurality of file objects with the twin file of the file object currently being restored.

2. The method of claim 1, wherein the twin file of the file object currently being restored comprises an encrypted and compressed version of a payload of the file object currently being restored.

3. The method of claim 1, further comprising:
in response to detecting the abort, preserving the twin file of the file object currently being restored if it exists at a time of the abort.

4. The method of claim 3, wherein preserving the twin file of the file object currently being restored comprises:

storing the twin file of the file object currently being restored at the reconstruction container if the twin file of the file object currently being restored is at or en route to the reconstruction container at the time of the abort;

storing the twin file of the file object currently being restored in the operational buffer if the twin file of the file object currently being restored is at the operational buffer or en route to a restore agent at the time of the abort.

5. The method of claim 1, further comprising:

in response to receiving no acknowledgement of the twin file, determining that no twin file has been created for the file object currently being restored at a time of the abort; and transmitting to the target device, a request index of the file object currently being restored.

6. The method of claim 1, wherein commencing restoration of the plurality of file objects with the twin file of the file object currently being restored comprises:

instructing the operational buffer to transmit the file object currently being restored to the reconstruction container.

7. The method of claim 6, wherein commencing restoration of the plurality of file objects with the twin file further comprises:

restoring, during the second restore session, any of the plurality of file objects requested that have not yet been restored.

8. A system comprising:

a target device to back up data; and a host device to:

transmit, to a target device, a request to restore a plurality of file objects to a host device;

restore, during a first restore session, one or more of the plurality of file objects requested, wherein restoring a file object comprises:

creating a twin file of the file object using a Siamese engine and appending the twin file to the file object;

storing the file object and the twin file in an operational buffer; and transmitting the file object and the twin file to a reconstruction container;

detect an abort of the first restore session;

pause restoration of a file object currently being restored in response to detecting the abort;

poll, during a second restore session, for a twin file of the file object currently being restored; and in response to receiving an acknowledgement of the twin file of the file object currently being restored, commence restoration of the plurality of file objects with the twin file of the file object currently being restored.

9. The system of claim 8, wherein the twin file of the file object currently being restored comprises an encrypted and compressed version of a payload of the file object currently being restored.

10. The system of claim 8, wherein the host device is further to:

in response to detecting the abort, preserve the twin file of the file object currently being restored if it exists at a time of the abort.

11. The system of claim 10, wherein to preserve the twin file of the file object currently being restored, the host device is to:

store the twin file of the file object currently being restored at the reconstruction container if the twin file of the file object currently being restored is at or en route to the reconstruction container at the time of the abort;

store the twin file of the file object currently being restored in the operational buffer if the twin file of the file object currently being restored is at the operational buffer or en route to a restore agent at the time of the abort.

12. The system of claim 8, wherein the host device is further to:

in response to receiving no acknowledgement of the twin file, determine that no twin file has been created for the file object currently being restored at a time of the abort; and transmit to the target device, a request index of the file object currently being restored.

13. The system of claim 8, wherein to commence restoration of the plurality of file objects with the twin file of the file object currently being restored, the host device is to:

instruct the operational buffer to transmit the file object currently being restored to the reconstruction container.

14. The system of claim 13, wherein to commence restoration of the plurality of file objects with the twin file, the host device is further to:

restore, during the second restore session, any of the plurality of file objects requested that have not yet been restored.

15. A non-transitory computer readable medium, having instruction stored thereon that when executed by a processing device, cause the processing device to:

transmit, to a target device, a request to restore a plurality of file objects to a host device;

restore, during a first restore session, one or more of the plurality of file objects requested, wherein restoring a file object comprises:

creating a twin file of the file object using a Siamese engine and appending the twin file to the file object;

storing the file object and the twin file in an operational buffer; and transmitting the file object and the twin file to a reconstruction container;

detect an abort of the first restore session;

pause restoration of a file object currently being restored in response to detecting the abort;

poll, during a second restore session, for a twin file of the file object currently being restored; and in response to receiving an acknowledgement of the twin file of the file object currently being restored, commence restoration of the plurality of file objects with the twin file of the file object currently being restored.

16. The non-transitory computer readable medium of claim 15, wherein the twin file of the file object currently being restored comprises an encrypted and compressed version of a payload of the file object currently being restored.

17. The non-transitory computer readable medium of claim 15, wherein the processing device is further to:

in response to detecting the abort, preserve the twin file of the file object currently being restored if it exists at a time of the abort.

18. The non-transitory computer readable medium of claim 17, wherein to preserve the twin file of the file object currently being restored, the processing device is to:

store the twin file of the file object currently being restored at the reconstruction container if the twin file of the file object currently being restored is at or en route to the reconstruction container at the time of the abort;

store the twin file of the file object currently being restored in the operational buffer if the twin file of the file object currently being restored is at the operational buffer or en route to a restore agent at the time of the abort.

19. The non-transitory computer readable medium of claim 15, wherein the processing device is further to:

in response to receiving no acknowledgement of the twin file, determine that no twin file has been created for the file object currently being restored at a time of the abort; and transmit to the target device, a request index of the file object currently being restored.

20. The non-transitory computer readable medium of claim 15, wherein to commence restoration of the plurality of file objects with the twin file of the file object currently being restored, the processing device is to:

instruct the operational buffer to transmit the file object currently being restored to the reconstruction container.

* * * * *